US012450052B2

(12) United States Patent
Sistu et al.

(10) Patent No.: US 12,450,052 B2
(45) Date of Patent: Oct. 21, 2025

(54) BUSINESS EVENT AUGMENTER (71) Applicant: FMR LLC, Boston, MA (US)

(72) Inventors: UmaMahesh Sistu, Karnatka (IN); Shu Wang, Liaoing (CN)

(73) Assignee: FMR LLC, Boston, MA (US)

( * ) Notice: Subject to any disclaimer, the term of this patent is extended or adjusted under 35 U.S.C. 154(b) by 304 days.

(21) Appl. No.: 18/214,966

(22) Filed: Jun. 27, 2023

(65) Prior Publication Data

US 2024/0385831 A1  Nov. 21, 2024

(30) Foreign Application Priority Data

May 16, 2023 (IN) .............................. 202341034345

(51) Int. Cl.
 G06F 8/71 (2018.01)
 G06N 20/00 (2019.01)
(52) U.S. Cl.
 CPC .............. G06F 8/71 (2013.01); G06N 20/00 (2019.01)
(58) Field of Classification Search
 CPC ................................. G06F 8/71; G06N 20/00
 See application file for complete search history.

(56) References Cited

U.S. PATENT DOCUMENTS

| | | | |
|---|---|---|---|
| 7,865,888 B1* | 1/2011 | Qureshi | G06N 5/048 717/170 |
| 9,356,883 B1* | 5/2016 | Borthakur | H04L 41/5025 |
| 10,373,072 B2* | 8/2019 | Britton | G06N 20/00 |
| 10,397,370 B2* | 8/2019 | Tak | H04L 41/145 |
| 10,417,528 B2* | 9/2019 | Ma | G06F 18/2163 |
| 11,340,940 B2* | 5/2022 | Savant | G06F 11/3414 |
| 2017/0373935 A1* | 12/2017 | Subramanian | G06F 11/3006 |
| 2019/0340095 A1* | 11/2019 | Faibish | G06F 11/302 |
| 2021/0263749 A1* | 8/2021 | Laskawiec | G06F 9/44505 |
| 2022/0138081 A1* | 5/2022 | Varma | G06F 11/3684 717/124 |
| 2023/0177345 A1* | 6/2023 | Vilcu | G06N 3/044 706/21 |

* cited by examiner

*Primary Examiner* — Douglas M Slachta
(74) *Attorney, Agent, or Firm* — Cesari and McKenna, LLP (57) ABSTRACT

A method for analyzing and improving a configuration of an executable event-based application includes receiving, by a computer system, the configuration of the event-based application and the event-based application. The method includes linting the configuration. The method further includes generating a predicted performance of the application in relation to the event streaming platform using a machine learning model. The method also includes generating, at least one first recommendation, based on the predicted performance, for improving the configuration. The method includes applying the at least one first recommendation to the configuration. The method includes executing the application. The method further includes measuring an actual performance of the application in relation to the event streaming platform. The method also includes generating at least one second recommendation based on the actual performance of the application that fine-tunes a corresponding one of the at least one first recommendation.

20 Claims, 5 Drawing Sheets

Fig. 2

```
{
  "decision_id": "35d0ee7c-e4ce-4f4e-96e8-31679a7bb7fe",
  "result": {
    "score": 79.0697674418604651115,
    "status": "FAILED",
    "violation": [
      {
        "msg": "[VIOLATION]: The value of security.protocol should not be [PLAINTEXT] if it's configured.",
        "parameter": "security.protocol",
        "value": "PLAINTEXT"
      },
      {
        "msg": "[VIOLATION]: retries should not be configured to 0, usually we keep it as default, or configure a number bigger than 100.",
        "parameter": "retries",
        "value": 0
      }
    ],
    "warning": [
      {
        "msg": "[WARNING]: It's not recommended to configure metrics.recording.level to DEBUG or TRACE for production, that will produce much more metrics may exceed the quotas.",
        "parameter": "metrics.recording.level",
        "value": "TRACE"
      },
      {
        "msg": "[WARNING]: acks should not be configured to 0 except you need extremely low latency and high throughput.",
        "parameter": "acks",
        "value": 0
      },
      {
        "msg": "[WARNING]: buffer.memory was configured too big, this setting should correspond roughly to the total memory the producer will use, the recommended value is 536870912",
        "parameter": "buffer.memory",
        "value": 5368709120
      },
      {
        "msg": "[WARNING]: compression.type was not configured, usually we configure to 'zstd', 'zstd' has better balance of cpu, memory / performance",
        "parameter": "compression.type"
      },
      {
        "msg": "[WARNING]: request.timeout.ms was not configured to 120000. This should also be larger than replica.lag.time.max.ms (a broker configuration) to reduce the possibility of message duplication due to unnecessary producer retries.",
        "parameter": "request.timeout.ms",
        "value": 120000
      }
    ]
  }
}
```

BUSINESS EVENT AUGMENTER

CROSS-REFERENCE TO RELATED APPLICATION

The present application claims the benefit of India Provisional Patent Application Serial No. 202341034345, entitled "Business Event Augmenter" and filed on May 16, 2023, which is hereby incorporated by reference herein in its entirety.

BACKGROUND

Technical Field

The present invention relates to event streaming and event-based computer applications, and more specifically to analyzing and improving a configuration of an event-based application.

Background

Event streaming platforms are often centralized platforms that connect various business units of a company on a large scale. Large numbers of event producers and event consumers may be subscribed to an event streaming platform to send and/or receive streaming events. Each event producer and event consumer has a configuration that controls how the product or consumer interacts with the event streaming platform. Each configuration, in turn, includes numerous parameters and associated values to control that interaction. Manually testing various configuration options and ensuring that the parameters in those options comply with security requirements and business policies, while also providing an optimal performance, is a time-consuming and error-prone task.

SUMMARY

In accordance with an embodiment of the present invention, the deficiencies of the prior art are overcome by providing a computer-implemented method for analyzing and improving a configuration of an executable event-based application. The configuration controls an interaction between the event-based application and an event streaming platform. The method includes receiving, by a computer system, the configuration of the event-based application and the event-based application. The method includes linting, by the computer system, the configuration. The method further includes generating, by the computer system, a predicted performance of the application in relation to the event streaming platform using a machine learning model. The method also includes generating, by the computer system, at least one first recommendation, based on the predicted performance, for improving the configuration. The method includes applying, by the computer system, the at least one first recommendation to the configuration. The method includes executing, by the computer system, the application. The method further includes measuring, by the computer system, an actual performance of the application in relation to the event streaming platform. The method also includes generating, by the computer system, at least one second recommendation based on the actual performance of the application that fine-tunes a corresponding one of the at least one first recommendation.

Alternatively, or in addition, the method includes updating, by the computer system, at least one of a parameter and a hyperparameter of the machine learning model based on the actual performance of the application. The computer system may receive the application and the configuration from a software repository. The computer system may execute the application in a test environment. Alternatively, or in addition, the computer system may execute the application in a production environment.

Also alternatively, or in addition, the configuration includes at least one of a policy configuration, a security configuration, a governance configuration, and a performance configuration. The method may further include storing data related to the actual performance of the application in a database. The method may further include applying, by the computer system, the at least one second recommendation to the configuration.

Further alternatively, or in addition, the configuration is linted statically using a rule engine. The machine learning model may have been trained using performance data from the database.

In accordance with another embodiment of the present invention, a system for analyzing and improving a configuration of an executable event-based application, wherein the configuration controls an interaction between the event-based application and an event streaming platform, includes a computer system having a processor coupled to a memory. The processor is configured to receive the configuration of the event-based application and the event-based application. The processor is configured to lint the configuration. The processor is also configured to generate a predicted performance of the application in relation to the event streaming platform using a machine learning model. The processor is further configured to generate at least one first recommendation, based on the predicted performance, for improving the configuration. The processor is configured to apply the at least one first recommendation to the configuration. The processor is further configured to execute the application, The processor is also configured to measure an actual performance of the application in relation to the event streaming platform. The processor is configured to generate at least one second recommendation based on the actual performance of the application that fine-tunes a corresponding one of the at least one first recommendation.

Alternatively, or in addition, the processor is further configured to update at least one of a parameter and a hyperparameter of the machine learning model based on the actual performance of the application. The computer system may receive the application and the configuration from a software repository.

Also alternatively, or in addition, the configuration includes at least one of a policy configuration, a security configuration, a governance configuration, and a performance configuration. The processor may further be configured to store data related to the actual performance of the application in a database. The processor may further be configured to apply the at least one second recommendation to the configuration.

Further alternatively, or in addition, the configuration is linted statically using a rule engine. The machine learning model may have been trained using performance data from the database.

In accordance with yet another embodiment of the present invention, a non-transitory computer-readable medium has software analyzing and improving a configuration of an executable event-based application encoded thereon. The configuration controls an interaction between the event-based application and an event streaming platform. The software, when executed by one or more processors, is operable to receive the configuration of the event-based application and the event-based application. The software is operable to lint the configuration. The software is also operable to generate a predicted performance of the application in relation to the event streaming platform using a machine learning model. The software is further operable to generate at least one first recommendation, based on the predicted performance, for improving the configuration. The software is operable to apply the at least one first recommendation to the configuration. The software is operable to execute the application. The software is also operable to measure an actual performance of the application in relation to the event-streaming platform. The software is further operable to generate at least one second recommendation based on the actual performance of the application that fine-tunes a corresponding one of the at least one first recommendation.

Alternatively, or in addition, the software is further operable to update at least one of a parameter and a hyperparameter of the machine learning model based on the actual performance of the application.

BRIEF DESCRIPTION OF THE DRAWINGS

The description below refers to the accompanying drawings, of which:

FIG. 3 is an illustration of a static linting result in accordance with an embodiment of the present invention;

DETAILED DESCRIPTION OF ILLUSTRATIVE EMBODIMENTS

Figure 1:
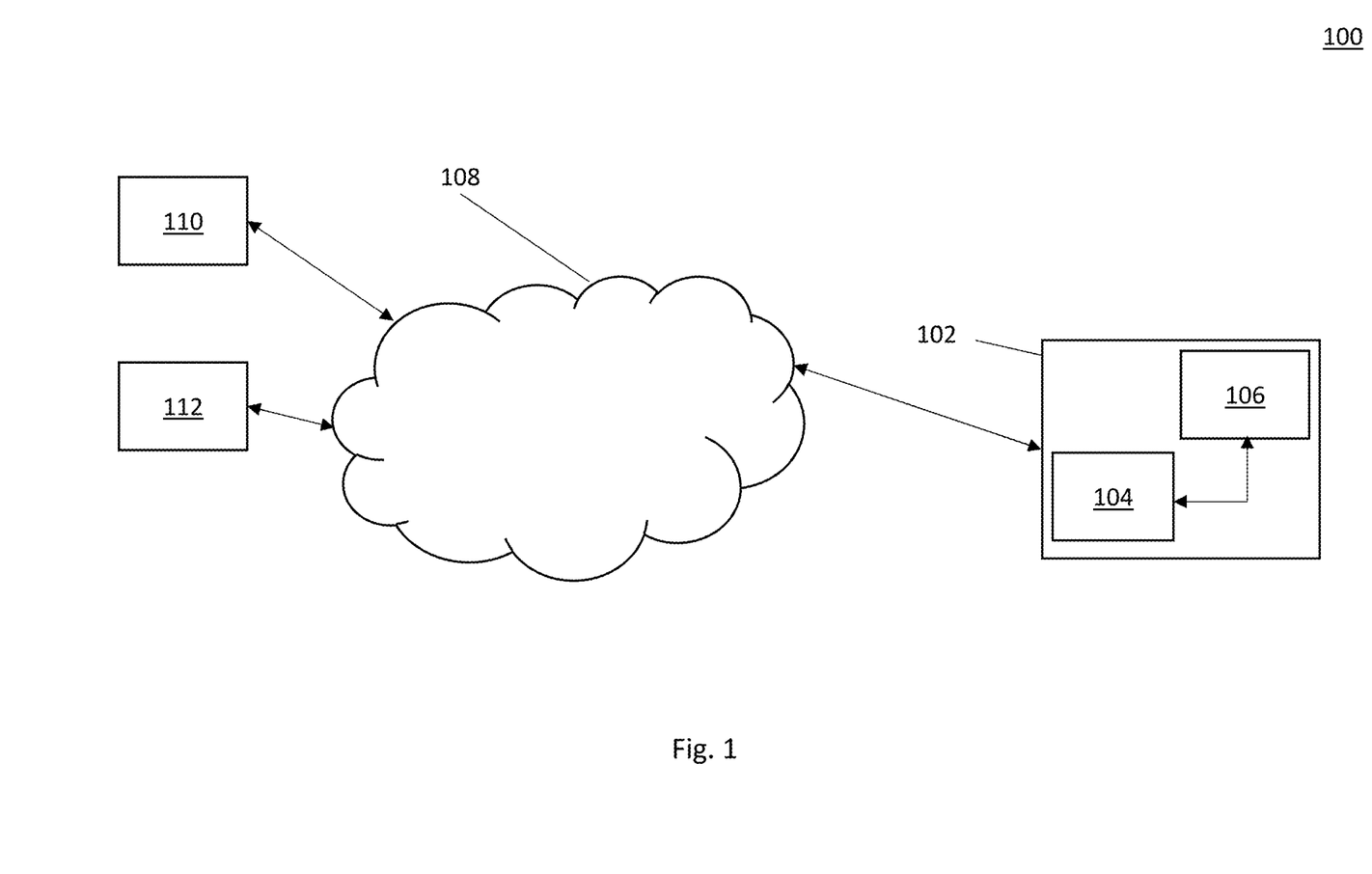
FIG. 1 is an illustration of a system for analyzing and improving a configuration of an executable event-based application in accordance with an embodiment of the present invention.

FIG. 1 is an illustration of a system 100 for analyzing and improving a configuration of an executable event-based application in accordance with an embodiment of the present invention. System 100 includes a computer system 102. The computer system 102 has a processor 104 coupled to a memory 106. The computer system 102 may also be communicatively coupled to a communications network 108. Network 108 may be a public network, such as the internet, or it may be a private network, such as a network internal to a company. Network 108 also may be a combination of public and/or private networks. The computer system 102 may be coupled to the network 108 directly, for example via an Ethernet cable or via wireless connection such as Wi-Fi. Computer system 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The processor 104 is configured to execute the method described below in detail with reference to FIG. 2. It is also expressly noted that the computer system 102 may include more than one computing device. For example, the computer system 102 may include more than one processor 104 and more than one memory 106, with each one of the processors 104 coupled to a corresponding memory 106. The processors 104 may be communicatively coupled to the network 108. Illustratively, one or more of the processors 104 and memories 106 may be part of a cloud service, such as Amazon Web Services, publicly available at aws.amazon.com. The processors 104 may be configured collectively to execute the steps of the method 200 described below. The steps of the method may be executed by different processors 104, or they may be executed by the same processor 104.

Also coupled to the network 108 is an event streaming platform 110. The event streaming platform may be any suitable event streaming platform known to the skilled person. Illustratively, the event streaming platform 110 may be an Apache Kafka platform, as known and publicly available at kafka.apache.org. Apache Kafka is a distributed event store and stream-processing platform that provides a unified, high-throughput, low-latency platform for handling real-time data feeds. Apache Kafka allows applications to subscribe to it and publish data to any number of other subscribed systems and/or real-time applications. Subscribed applications may also receive event data from any number of other subscribed systems and/or real-time applications. An application subscribed to Apache Kafka may be a producer, i.e., it publishes events, a consumer, i.e., it receives published events from other applications, or a combination thereof. The event streaming platform provides one or more event brokers. The event brokers route events from producers to consumers. The interaction between a subscribed application and the event streaming platform is controlled by a configuration of the application. This configuration includes one or more parameters as described in further detail below. Once again, it is expressly noted that, while Apache Kafka is described herein, any suitable event streaming platform that allows subscribed applications to publish events to other applications and receive events from other applications may be used. While the event streaming platform 110 is shown here coupled to the network 108, it is also expressly contemplated that the event streaming platform 110 may be hosted on the computer system 102.

Further coupled to the network 108 may be a database 112. The database 112 may be provided by any publicly available database system known to the skilled person. It may be a commercial database or an open-source database. While the database 112 is shown here coupled to the network 108, it is also expressly contemplated that the database 112 may be hosted on the computer system 102. The database 112 allows the computer system 102 to store and retrieve data.

Figure 2:
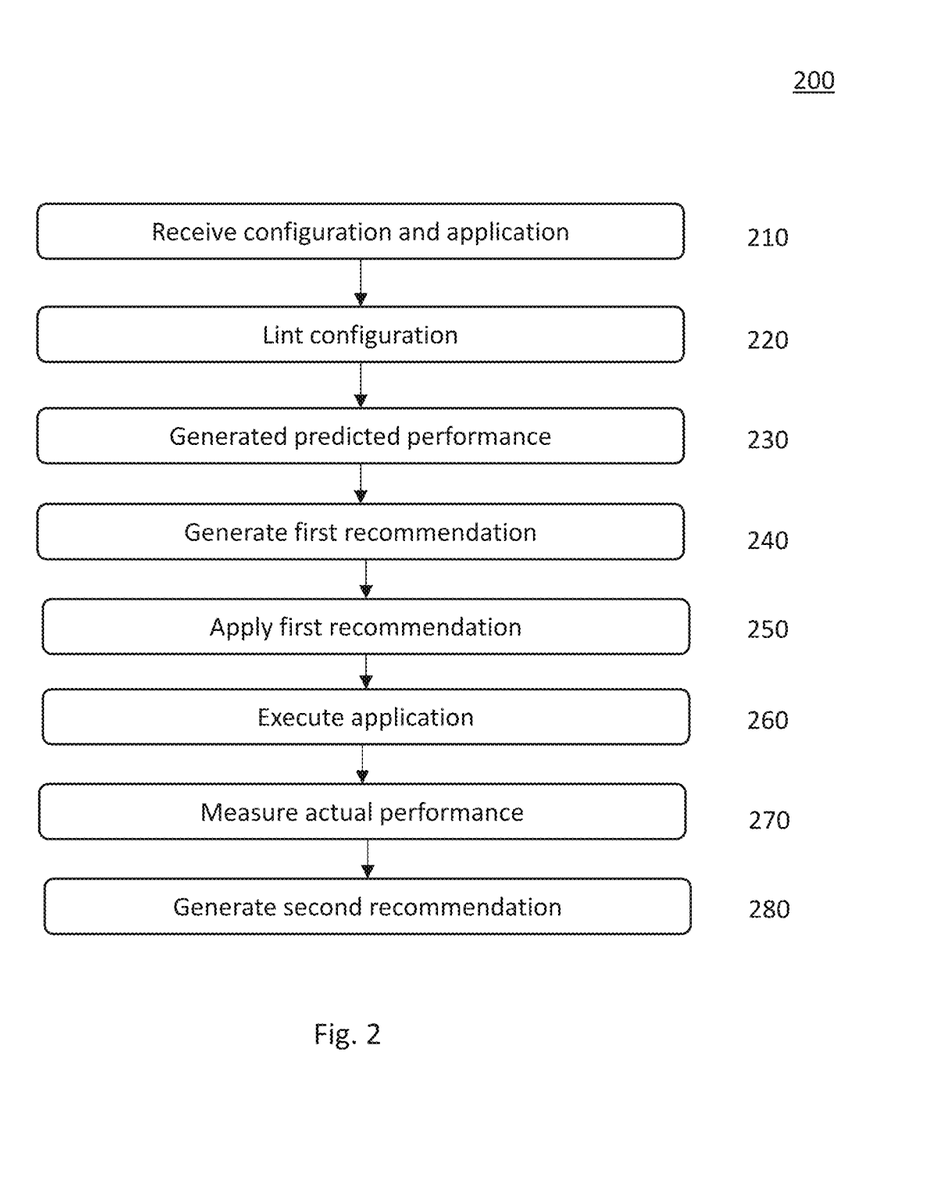
FIG. 2 is a flowchart of a method for analyzing and improving a configuration of an executable event-based application in accordance with an embodiment of the present invention.

FIG. 2 is a flowchart of a computer-implemented method 200 for method for analyzing and improving a configuration of an executable event-based application in accordance with an embodiment of the present invention. The configuration controls an interaction between the event-based application and an event streaming platform, for example event streaming platform 110 as described above. Specifically, method 200 may be executed by a processor of computer system 102 as described above with reference to FIG. 1. Similar to what is described above, the computer system 102 is coupled to a communications network 108. Also coupled to the communications network, or hosted on the computer system 102, are an event streaming platform 110 and a database 112, as described above.

In step 210, the computer system 102 receives the configuration of the event-based application and the event-based application. The computer system 102 may receive the configuration and the application over the network 108, from a file system, from the database 112, or from any other suitable source. The computer system 102 may also receive the application and its configuration from a software repository. The software repository may be any suitable software repository known to the skilled person. An example for such a software repository is git, publicly available at git-scm.com. The software repository may be hosted on the computer system 102, or it may be hosted on a different device coupled to the network 108. In that case, the computer system 102 receives the application and its configuration from the software repository over the network 108. It is also expressly contemplated that the computer system 102 may receive the configuration of the application from a different source than the application itself. For example, the computer system 102 may receive the application from a software repository and the configuration of the application from the database 112. The configuration of the application may include parameters and their associated values for various aspects of the application and its execution. For example, the configuration may include parameters related to one or more of policy, security, governance, and performance. As described in detail below, the different aspects of the configuration may be treated differently. For example, the policy, security, and governance configurations may be evaluated by a static linting process, and the performance configuration may be evaluated and tuned by a dynamic process using a machine learning model.

In step 220, the computer system 102 lints the configuration. Exemplarily, the computer system 102 statically lints the configuration to ensure that the configuration is compliant with security policies and business restrictions. In other words, the computer system 102 may statically lint the policy configuration, security configuration, and governance configuration components of the application configuration. The computer system 102 may lint the configuration using a rule engine such as the Open Policy Agent, and opensource, general purpose policy engine publicly available at openpolicyagent.org. The computer system 102 may also lint the configuration using any other suitable linting software or policy engine known to the skilled person. The purpose of the initial static linting is to make sure that the configuration of the application does not validate certain unnegotiable parameters. For example, the rule engine may ensure that the configuration follows security best practices and is compliant with any business policies that may be applicable to the application. To this end, the rule engine may evaluate the configuration based on a set of rules that have been predefined for the event streaming platform 110. These rules may have been predefined based on experience over a period of time and/or best practices in the business or industry. The rule engine executing on computer system 102 may retrieve these rules from a file system, from the database 112, or over the network 108. The rules may define required values for certain configuration parameters. If the configuration of the application meets these values, the configuration passes the static linting step. If the configuration does not meet these values, the configuration fails the static linting step. The rule engine may generate a pass or fail result of each configuration value and/or for the entire configuration.

In one example, the configuration may include a parameter that defines a security protocol for the interaction of the application with the event streaming platform 110. Possible values for the parameter may be plain text, Secure Sockets Layer (SSL), plain text over a Simple Authentication and Security Layer (SASL), and SSL over SASL. Security best practices and/or business policies may require that the application communicates with the event streaming platform 110 in an encrypted manner. For that reason, the rule engine may ensure that the parameter is set to either SSL or SSL over SASL. If the parameter is set to plain text or plain text over SASL, the rule engine may reject the application configuration. If the rule engine rejects the application configuration, the method ends, and the configuration will not be analyzed or processed any further FIG. 3 is an illustration of a static linting result in accordance with an embodiment of the present invention. As can be seen, the application configuration failed the evaluation by the rule engine. The linting resulted in two violations and five warnings. The rule engine produces violations and warnings for each configuration parameter if necessary. In this example, the selected security protocol and the selected number of retries in the configuration produced the violations. Other parameters resulted in warnings. If the evaluation result includes one or more violations, the configuration fails the static linting. This is indicated by the "failed" status in the result. If the evaluation result includes no violations, the configuration passes the static linting step, even if the result includes warnings. In some embodiments, the rule engine may evaluate configuration parameters related to applications security and application features, but it may not evaluate configuration parameters related to application performance, latency, or throughput.

In step 230, the computer system 102 generates a predicted performance of the application in relation to the event streaming platform. The computer system 102 generates the predicted performance using a machine learning model as described below. Illustratively, the predicted performance may be generated based on configuration values related to throughput, latency, durability, and accessibility. In other words, the predicated performance may be based on the performance configuration component of the application configuration. Throughput is the rate at which data is passed from event producers to event brokers and/or from event brokers to event consumers; latency is the time elapsed while passing event messages from end to end, i.e., from the event generator to the broker to the event consumer; durability refers to the property of the event streaming platform that event messages committed to the platform will not be lost; availability refers to minimizing downtime in case of unexpected failures of the event streaming platform, the event brokers, event producers, and/or event consumers.

Figure 4:
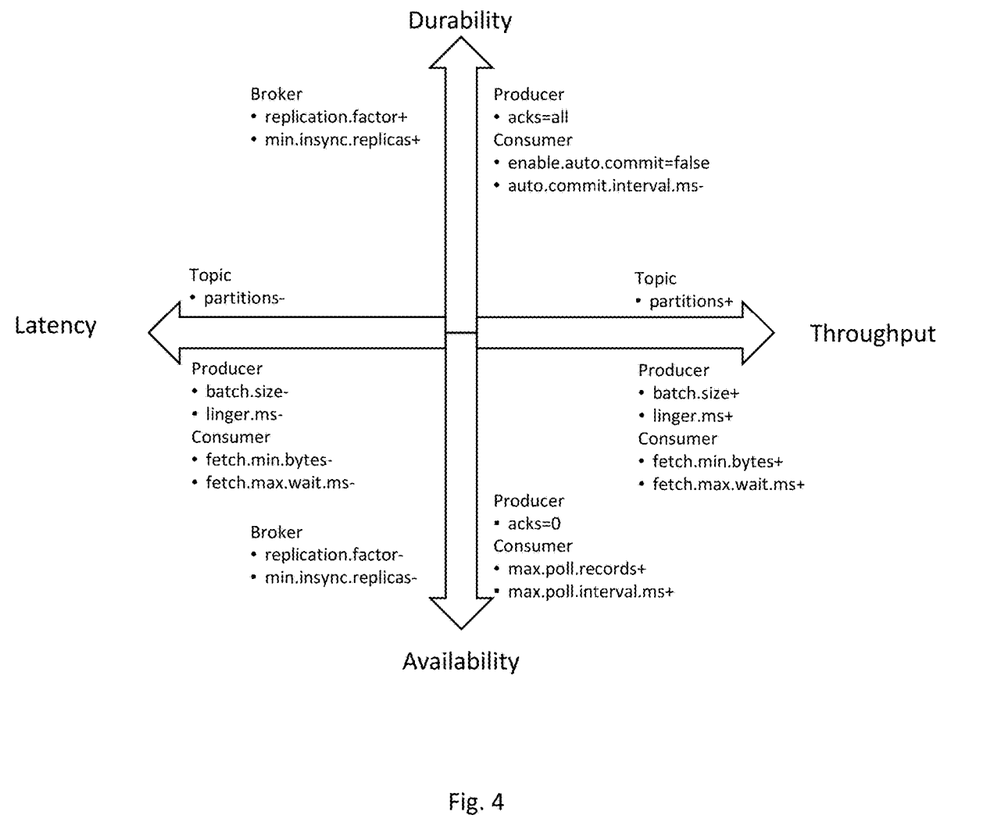
FIG. 4 is an exemplary set of configuration parameters and their interconnections.

The computer system 102 generates the predicted performance using a machine learning model. Exemplarily, the computer system 102 may use a commercially available machine learning model. One example for such a publicly available model is Amazon SageMaker, available at aws.amazon.com/sagemaker. This machine learning platform enables users to create, train, and deploy machine learning models in the cloud and/or on dedicated computing devices. The platform also allows for different levels of abstraction: it provides pre-trained machine learning models that may be used as is, it provides machine learning models that users may train on their own data, and it provides mechanisms to create machine learning models and algorithms from scratch. Illustratively, the computer system 102 uses a machine learning model that has been trained with specific configuration parameters and their values to produce a predicted performance of the application in relation to the event streaming platform 110. For example, the machine learning model may have been trained with parameters and their associated values related to throughput, latency, durability, and availability. FIG. 4 shows an exemplary set of configuration parameters and their interconnections. As can be seen, modifying a configuration parameter to positively influence one performance aspect may negatively influence another. For example, increasing the batch size to increase throughput has a negative effect on latency. Larger batches of data in event message, while increasing throughput, also take longer to travel from event producer through the event broker to the event consumer. In another example, setting the configuration parameter 'acks' such that all events are acknowledged on their way through the event streaming platform increases durability as it ensures that no events get lost. On the other hand, it reduces availability since events may be retransmitted over and over if one of the event streaming platform components fails to acknowledge an event message.

The machine learning model have been trained using linear regression and normalized data. Normalization ensures that all parameters, regardless of their value range, have a similar weight for the model. In addition, highly correlated parameters may be removed to decrease the number of parameters the model needs to handle. For example, if configuration parameters A and B are highly correlated, there is no requirement for the model to evaluate both parameters as one of them is substantially redundant. One of the parameters may be removed from the model input to reduce the size of the input vector. To generate the training dataset, a large number of configuration parameter sets is generated, with random values for each of the configuration parameters that is a model input. The random values are generated throughout the allowed range of values for each parameter. Each randomly generated configuration is then applied to the application and executed. The performance of the application is measured and recorded. The configuration parameters and their associated measured performance are given to the machine learning model as training data. The model is then trained on that training data. In some embodiments, the training data may also include additional measured performance data and its associated configurations, such as data measured and stored as described below with reference to step 270. This additional training data may be retrieved from the database 112 and may be provided to the machine learning model in addition to, or alternatively to, the randomly generated training data.

In addition to application-related configuration parameters, the model input may also include parameters that relate to the event streaming platform itself. For example, the model input may include a parameter that indicates the number of nodes that the event streaming platform 110 runs on, the processors that it runs on, the memory available to the event streaming platform 110, and similar parameters. Including these parameters in addition to the application configuration parameters allows the model to predict application performance for event streaming platforms of various sizes and various capabilities. A machine learning model may be created and trained for each possible application that the method 200 may analyze, or one machine learning model may be created and trained for a plurality of potential applications. In that case, the machine learning model may be trained by configuring, executing, and measuring more than one application. Training the machine learning model using a plurality of applications increases its performance on unknown applications. In addition, the machine learning model may be trained for various configurations of event streaming platforms, as described above.

After the machine learning model has been trained, it may then be used to predict a performance of a given application based on a given set of configuration parameters. The computer system 102 provides the application configuration to the machine learning model. If there is more than one model for different applications, the computer system 102 also provides an identification of the application to the machine learning model. The computer system 102 then causes execution of the machine learning model on this input dataset. The machine learning model then outputs the predicted performance of the application using the given configuration and provides this predicted performance to the computer system 102. For example, the predicted performance may be related to the latency and/or the throughput of the application. In that case, the configuration may include the following parameters:

```
{
    "acks": 0,
    "retries": 0,
    "request.timeout.ms": 1200000,
    "security.protocol": "PLAINTEXT",
    "batch.size": 2621440000,
    "buffer.memory": 5368709120,
    "metrics.recording.level": "TRACE"
}
```

The computer system 102 may first process the configuration by validating that all parameters have acceptable values. The computer system 102 may also add missing parameters and their values, for example by selected default values for those parameters and/or values based on an identification of the application, the computer system itself, and/or the event streaming platform 110. The computer system 102 then provides the configuration to the machine learning model, causes execution of the machine learning model, and receives the output from the machine learning model. An exemplary output may be as follows:

```
{
    "latency": 234,
    "throughput": 443828
}
```

In this example, the machine learning model provides predicted performance values for the application's latency and its throughput given the configuration.

In step 240, the computer system 102 generates at least one first recommendation for improving the configuration of the application. The one or more first recommendations are based on the predicted performance generated in step 230. The one or more first recommendations may also be based on requirements of the application. For example, the application may require that all event messages are acknowledged to achieve maximum consistency. This means that, even if reducing the number of acknowledgments may improve the performance of the application, this configuration parameter cannot be changed because it is a requirement of the application. In other words, the 'ack' parameter is considered unchangeable. The computer system 102 may mark the unchangeable parameters as constant in the application configuration before generating the at least one first recommendation. In other embodiments, the computer system 102 may delete the unchangeable parameters from the application configuration before generating the at least one first recommendation.

To generate the one or more first recommendations, the application configuration, with the unchangeable parameters marked as constant, removed, and/or set to default values, is provided to the machine learning model. By varying the tunable parameters within their allowed value ranges, the machine learning model is executed various times to determine the best performance, for example by selecting the parameter values resulting in a minimum latency and/or a maximum throughput. For example, a configuration that has two parameters A and B, wherein A is tunable, and B is not because it is unchangeable, requires to optimize the value of parameter A to result in a minimum latency. The configuration including A and B, with B set to a constant value or its default value, is proved to the machine learning model various times with different values for A. The value for A that results in the lowest latency as predicted by the model, is then selected as one of the first recommendations. In other words, the at least one first recommendation includes a value for A that improves the performance of the application compared to the value for A included in the initial configuration.

In step 250, the computer system 102 applies the at least one first recommendation to the configuration of the application. To this end, the computer system 102 modifies the configuration to include the one or more first recommendations. In the example given above, the computer system 102 may modify the value for parameter A in the configuration and update it to the value that resulted in the lowest latency.

In step 260, the computer system 102 executes the application. To execute the application, the configuration modified in step 250 is used. The computer system 102 may execute the application in a test environment and/or in a production environment. Executing the application in a test environment ensures that the production environment remains undisturbed if the application configuration unexpectedly causes performance issues. However, executing the application in a production environment ensure that its performance may be measured under real-world conditions since the performance of the application in the test environment may differ from its performance in the production environment.

In step 270, the computer system 102 measures an actual performance of the application in relation to the event streaming platform 110. The computer system 102 may measure the actual performance during execution of the application. As stated above, the performance may be measured during execution of the application in a test environment, in a production environment, or both. Measuring the performance may include measuring latency, throughput, or any other suitable parameter related to the performance of the application in relation to the event streaming platform 110. Measuring the performance of the application is important to improve the machine learning model and its predictions. Since the machine learning model is not 100% accurate, the application may be executed, and its performance may be measured, more than once. Illustratively, and using the above example, the machine learning model predicted a value for configuration parameter A that resulted in the lowest predicted latency. To verify and improve the predictions of the machine learning model, initially the application may be executed three times: once with the value for parameter A that the machine learning model predicted as being best, once with the predicted value for A minus a selected step size, and once with the predicted value for A plus a selected step size. The step size may be statically chosen, or it may be a hyperparameter of the machine learning model. The computer system 102 then measures the performance for each one of the three executions. If the performance is best for the value for A as predicted by the model, the test ends here. If the performance is better for the value for A minus the step size, a subsequent test is performed centered around A minus step size, i.e. with an additional execution and measurement for a configuration parameter value for A set to the predicted value minus two times the step size. If the performance is better for the value for A plus the step size, a subsequent test is performed centered around A plus step size, i.e., with an additional execution and measurement for a configuration parameter value for A set to the predicted value plus two times the step size. The testing may be repeated iteratively until either the best performance value is found or until a selected number of iterations is reached. The selected number of iterations may also be a hyperparameter of the machine learning model. The computer system 102 may store data related to the one or more actual performance measurements and their associated configuration parameter values in the database 112.

In some embodiments, the computer system 102 may update at least one of parameter and a hyperparameter of the machine learning model based on the measurement of the actual performance of the application. For example, the computer system 102 may determine that the actual performance of the application differs from the predicted performance by more than a predetermined threshold. In that case, the computer system 102 may change one or more parameters of the machine learning model, such as number of layers, learning rate, number of nodes per layer, to improve the predictions of the machine learning model. The computer system 102 may also retrain the machine learning model after updating the parameters. Alternatively, or in addition, the computer system 102 may fine-tune the machine learning model by adding the application configuration to its training data. The computer system 102 may also change the values of certain hyperparameters of the machine learning model, such as the step size and number of iterations described above, to optimize the predictions of the machine learning model and/or to optimize the fine-tuning process.

In step 280, the computer system 102 generates at least one second recommendation based on the actual performance of the application measured in step 270. Each one of the one or more second recommendations fine-tunes a corresponding one of the one or more first recommendations. For example, if the repeated executions and measurements have shown that the performance using the predicted value for A is worse than using the predicted value plus two times the step size, the at least one second recommendations may include a recommendation to set the value of configuration parameter A to the initially predicted value plus two times the step size, In other words, the value of the second recommendation for A fine-tunes the initially recommended value for A in the application configuration. In some embodiments, the computer system 102 may modify the application configuration to include the one or more second recommendations.

Figure 5:
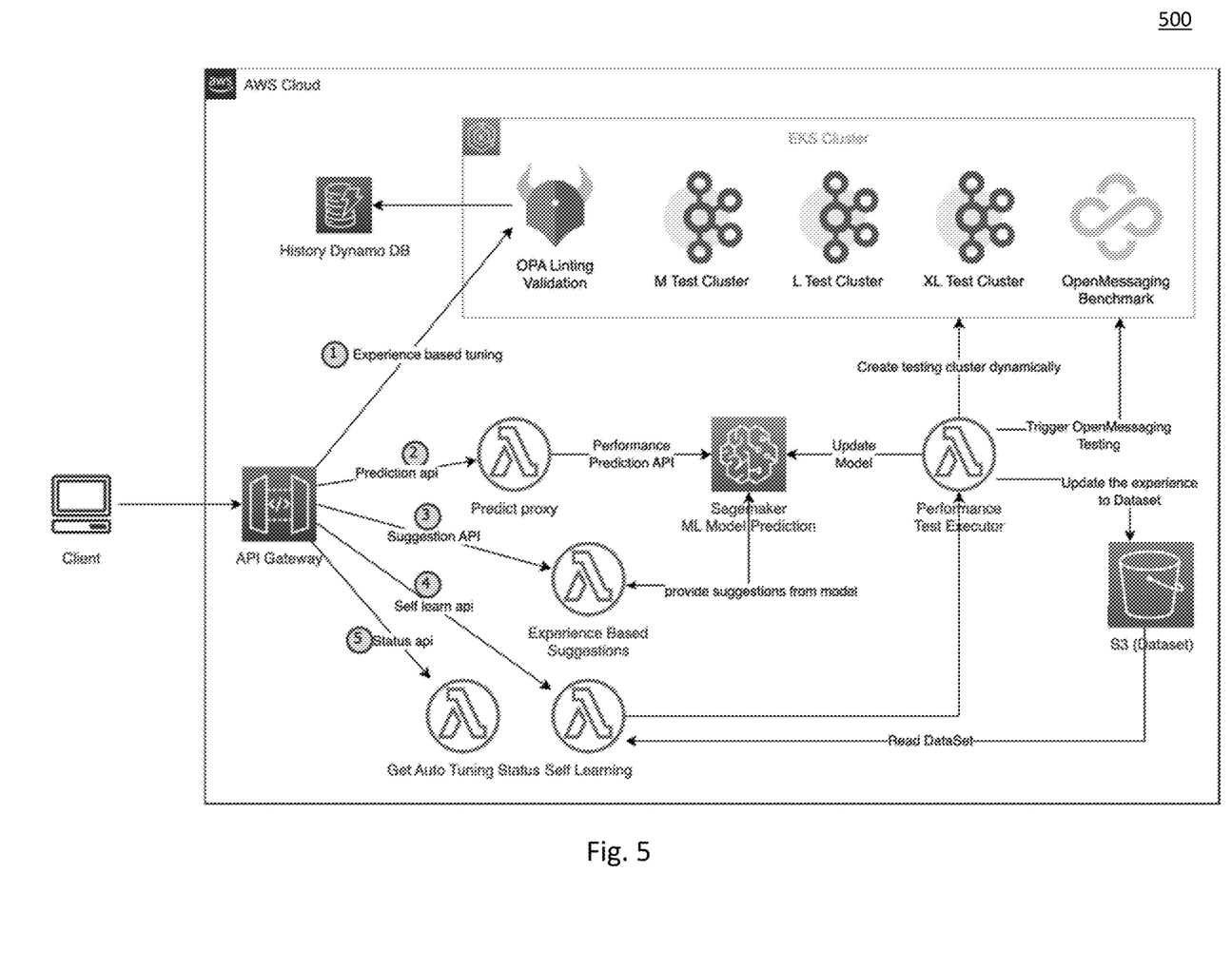
FIG. 5 is an illustration of a system architecture in accordance with an embodiment of the present invention.

FIG. 5 is an illustration of a system architecture 500 in accordance with an embodiment of the present invention. System architecture 500 reflects what is shown and described above in reference to FIGS. 1 and 2. Step 1 in FIG. 5 reflects the static linting, or experience-based tuning, described above with reference to step 220. The static linting may be based on experiences related to test clusters of different sizes and performance capabilities, such as medium, large, and extra-large test clusters. Step 2 in FIG. 5 reflects the performance prediction using a machine learning model, described above with reference to step 230. Illustratively, the performance prediction may be implemented as a lambda function that accesses the machine learning model hosted on and executed by Amazon Sage-Maker. Step 3 in FIG. 5 reflects the generation of at least one first recommendation, described above with reference to step 240. The generation of the one or more first recommendations may be implemented as a lambda function that receives the output of the machine learning model. Step 4 in FIG. 5 reflects the execution of the application and measurement of its performance as described above with reference to steps 260 and 270. Again, this functionality may be implemented as a lambda function. In addition, the performance test evaluation part may store its output in the database, as reflected here by an Amazon S3 database, and also provide its output to the machine learning model to improve the model's performance. Step 5 in FIG. 5 reflects the generation of at least one second recommendation, described above with reference to step 280. Generating the one or more second recommendations may also be implemented as a lambda function.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as C, C++, C#, Python, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for analyzing and improving a configuration of an executable event-based application, wherein the configuration controls an interaction between the event-based application and an event streaming platform, the method comprising:
   receiving, by a computer system, the configuration of the event-based application and the event-based application;
   linting, by the computer system, the configuration;
   generating, by the computer system, a predicted performance of the application in relation to the event streaming platform using a machine learning model;
   generating, by the computer system, at least one first recommendation, based on the predicted performance, for improving the configuration;
   applying, by the computer system, the at least one first recommendation to the configuration;
   executing, by the computer system, the application;
   measuring, by the computer system, an actual performance of the application in relation to the event streaming platform; and
   generating, by the computer system, at least one second recommendation based on the actual performance of the application that fine-tunes a corresponding one of the at least one first recommendation.

2. The computer-implemented method of claim 1, further comprising updating, by the computer system, at least one of a parameter and a hyperparameter of the machine learning model based on the actual performance of the application.

3. The computer-implemented method of claim 1, wherein the computer system receives the application and the configuration from a software repository.

4. The computer-implemented method of claim 1, wherein the computer system executes the application in a test environment.

5. The computer-implemented method of claim 1, wherein the computer system executes the application in a production environment.

6. The computer-implemented method of claim 1, wherein the configuration includes at least one of a policy configuration, a security configuration, a governance configuration, and a performance configuration.

7. The computer-implemented method of claim 1, further comprising storing data related to the actual performance of the application in a database.

8. The computer-implemented method of claim 1, further comprising applying, by the computer system, the at least one second recommendation to the configuration.

9. The computer-implemented method of claim 1, wherein the configuration is linted statically using a rule engine.

10. The computer-implemented method of claim 7, wherein the machine learning model has been trained using performance data from the database.

11. A system for analyzing and improving a configuration of an executable event-based application, wherein the configuration controls an interaction between the event-based application and an event streaming platform, the system comprising:
   a computer system having a processor coupled to a memory, the processor configured to:
   receive the configuration of the event-based application and the event-based application;
   lint the configuration;
   generate a predicted performance of the application in relation to the event streaming platform using a machine learning model;
   generate at least one first recommendation, based on the predicted performance, for improving the configuration;
   apply the at least one first recommendation to the configuration;
   execute the application;
   measure an actual performance of the application in relation to the event streaming platform; and
   generate at least one second recommendation based on the actual performance of the application that fine-tunes a corresponding one of the at least one first recommendation.

12. The system of claim 11, wherein the processor is further configured to update at least one of a parameter and a hyperparameter of the machine learning model based on the actual performance of the application.

13. The system of claim 11, wherein the computer system receives the application and the configuration from a software repository.

14. The system of claim 11, wherein the configuration includes at least one of a policy configuration, a security configuration, a governance configuration, and a performance configuration.

15. The system of claim 11, wherein the processor is further configured to store data related to the actual performance of the application in a database.

16. The system of claim 11, wherein the processor is further configured to apply the at least one second recommendation to the configuration.

17. The system of claim 11, wherein the configuration is linted statically using a rule engine.

18. The system of claim 15, wherein the machine learning model has been trained using performance data from the database.

19. A non-transitory computer-readable medium having software encoded thereon for analyzing and improving a configuration of an executable event-based application, wherein the configuration controls an interaction between the event-based application and an event streaming platform, the software, when executed by one or more computer systems operable to:
   receive the configuration of the event-based application and the event-based application;
   lint the configuration;
   generate a predicted performance of the application in relation to the event streaming platform using a machine learning model;
   generate at least one first recommendation, based on the predicted performance, for improving the configuration;
   apply the at least one first recommendation to the configuration;
   execute the application;
   measure an actual performance of the application in relation to the event-streaming platform; and
   generate at least one second recommendation based on the actual performance of the application that fine-tunes a corresponding one of the at least one first recommendation.

20. The non-transitory computer-readable medium of claim 19, wherein the software is further operable to update at least one of a parameter and a hyperparameter of the machine learning model based on the actual performance of the application.

* * * * *